(12) United States Patent
Ludwig et al.

(10) Patent No.: US 7,967,486 B2
(45) Date of Patent: Jun. 28, 2011

(54) AMBIENT MOOD LIGHT IN A SUNROOF OPENING TRIM RING

(75) Inventors: Adam Michael Ludwig, Ann Arbor, MI (US); Jim Scheerhorn, Holland, MI (US); Ralph Spooner, Holland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/628,570

(22) Filed: Dec. 1, 2009

(65) Prior Publication Data
US 2011/0128755 A1    Jun. 2, 2011

(51) Int. Cl.
*F21V 33/00* (2006.01)
(52) U.S. Cl. ........................................ 362/490; 362/511
(58) Field of Classification Search .................. 362/490, 362/493, 511, 543, 545
See application file for complete search history.

(56) References Cited

U.S. PATENT DOCUMENTS

| | | | |
|---|---|---|---|
| 6,666,571 B2 * | 12/2003 | Becher et al. | 362/490 |
| 6,890,089 B2 * | 5/2005 | Haering et al. | 362/490 |
| 7,284,886 B2 * | 10/2007 | Chen et al. | 362/488 |

FOREIGN PATENT DOCUMENTS

| | | |
|---|---|---|
| DE | 10241822 A1 | 3/2004 |
| GB | 2343214 A | 5/2000 |
| JP | 7089386 A | 4/1995 |
| JP | 10086748 A | 4/1998 |
| JP | 10119581 A | 5/1998 |
| JP | 2001171429 A | 6/2001 |
| WO | WO-2008024985 A2 | 2/2008 |

* cited by examiner

*Primary Examiner* — Laura Tso
(74) *Attorney, Agent, or Firm* — Gifford, Krass, Sprinkle, Anderson & Citkowski, P.C.

(57) ABSTRACT

The present invention provides a lighting assembly wherein a trim ring, containing a lighting assembly, is mounted on a vehicle headliner. The lighting assembly contains a lighting element having a light engine. The light engine having a housing and a light source mounted within the housing. The housing optionally containing a circuit board adapted to control light emitting from the light source. The light source contained within the housing may either be an LED or a traditional light bulb. The light source may optionally be colored, or textured, to provide unique ambient mood light options. The assembly further provides a light pipe having at least one light pipe aperture. The lighting element positioned adjacent, or connected to, the light pipe aperture. The light source in the lighting element directs light down the light pipe thereby creating a uniform output of light along the light pipe. Light from the light pipe is directed into the vehicle interior, mainly onto the vehicle headliner, thereby creating ambient mood lighting within the automotive interior.

18 Claims, 1 Drawing Sheet

AMBIENT MOOD LIGHT IN A SUNROOF OPENING TRIM RING

FIELD OF THE INVENTION

The present invention relates to vehicle lighting assemblies and, in particular, vehicle lighting assemblies used in connection with sunroof trim assemblies.

BACKGROUND OF THE INVENTION

Ambient mood lighting in automotive vehicles has become increasingly popular with increased usage of light emitting diodes (LED). LED lights are frequently the light source of choice for automobile designers looking for relatively inexpensive ways to enhance their vehicles' features by ambient mood lighting. LED lighting is cost efficient and creates a soft, warm and welcoming environment for a vehicle interior. LED lights have been used to illuminate compartments and vehicle accessories; however, LED lights have not been used to create ambient mood lighting within a trim ring, particularly, around a vehicle sunroof. Accordingly, it is particularly desirable to provide an assembly which provides ambient mood lighting in connection with a vehicle sunroof.

SUMMARY OF THE INVENTION

The present invention provides a lighting assembly wherein a trim ring, containing a lighting assembly, is mounted on a vehicle headliner. The lighting assembly contains a lighting element having a light engine. The light engine having a housing and a light source mounted within the housing. The housing optionally containing a circuit board adapted to control light emitting from the light source. The light source contained within the housing may either be an LED or a traditional light bulb. The light source may optionally be colored or textured to provide unique ambient mood light options. The assembly further provides an elongated cylindrical solid, generally transparent light pipe. The lighting element positioned adjacent, or connected to, a first end of the light pipe. The assembly may further include a second end of a light pipe positioned adjacent, or connected to, a second lighting element. The light source in the lighting element directs light down the light pipe thereby creating a uniform output of light along the light pipe. Light from the light pipe is directed into the vehicle interior, mainly onto the vehicle headliner, thereby creating ambient mood lighting within the automotive interior.

DETAILED DESCRIPTION OF THE INVENTION

The present invention provides a lighting assembly wherein a trim ring containing a lighting assembly is mounted on a vehicle headliner. The lighting assembly provides ambient mood lighting to the interior of a motor vehicle. The lighting assembly is comprised of a light engine having a housing and a light source mounted within the housing, and an elongated light pipe. The light source directs, or transmits, light down the light pipe thereby creating a uniform output of light along the light pipe. Light from the light pipe is directed into the vehicle interior, mainly onto the vehicle headliner, thereby creating ambient mood lighting within the automotive interior.

Figure 1:
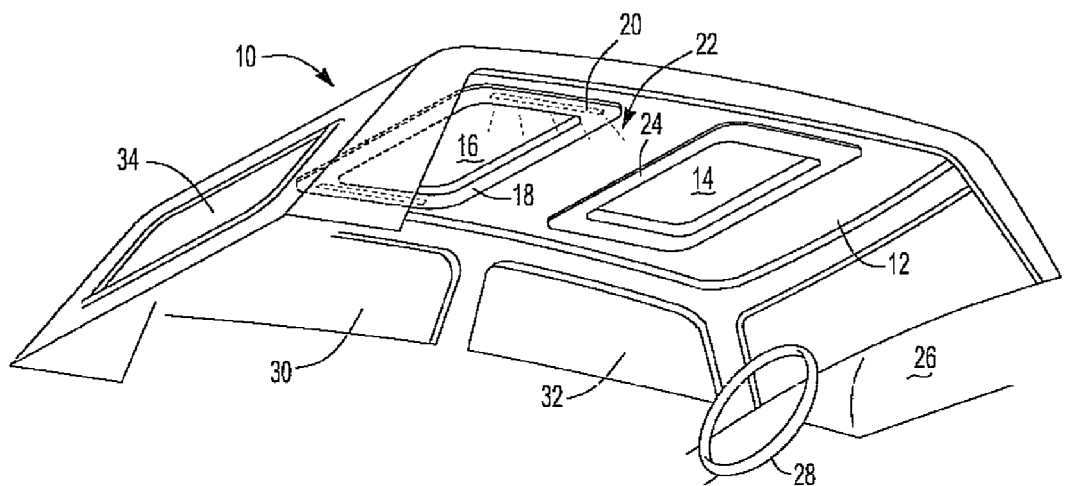
FIG. 1 provides a perspective view of an interior vehicle headliner with multiple sunroof trim assemblies with an installed ambient mood lighting assembly.

FIG. 1 provides a perspective view of an interior vehicle headliner 12 on a vehicle 10 with multiple sunroof trim assemblies, one of which having an ambient mood lighting assembly 20. In this embodiment, the vehicle 10 is depicted with a first sunroof 14 and a second sunroof 16. A lighting assembly 20 is provided for on the second sunroof 16. Ambient light 22 is directed into the automotive interior from the lighting assembly 20 on the second sunroof trim assembly 16. The second sunroof trim assembly 16 is comprised of a trim ring 18 and a lighting assembly 20 installed therein. For installment purposes, the headliner 12 requires at least one cutout portion to accept the sunroof trim assemblies 14, 16. The second sunroof 16 is installed into the vehicle headliner 12 by means of such a cutout. Although not depicted in FIG. 1, sunroof trim assembly 14 may also include a lighting assembly. The vehicle 10 is shown with a plurality of windows 30, 32, 34, the dashboard 26 and the steering wheel 28. The lighting assembly 20 may be used in connection with other vehicles such as trucks, recreational vehicles, sport utility vehicles, or the like.

Figure 2:
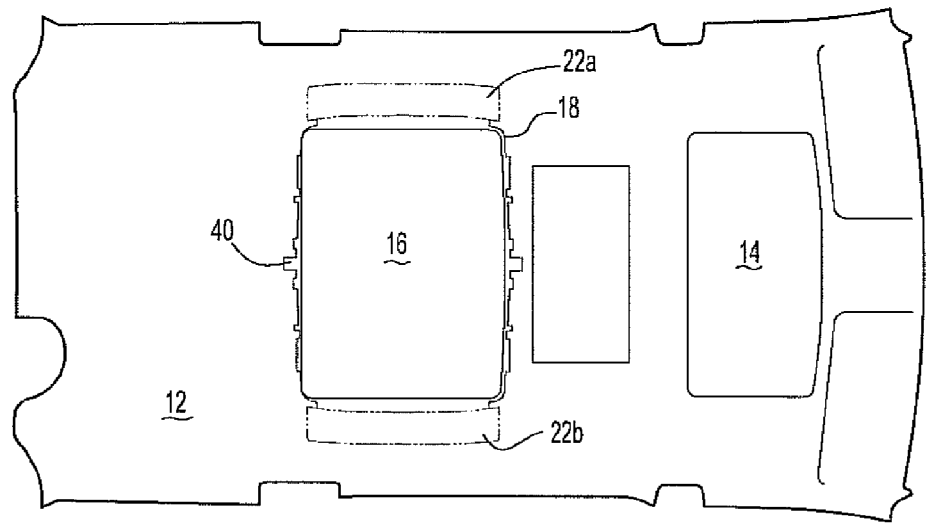
FIG. 2 provides an interior view of a vehicle headliner with multiple sunroof trim assemblies with an installed ambient mood lighting assembly.

FIG. 2 provides an interior view of a vehicle headliner 12 with multiple sunroof trim assemblies 14, 16 with sunroof 16 including the ambient mood lighting assembly 20. Light 22a, 22b is projected away from the sunroof trim assembly 16 onto the vehicle headliner 12 to create soft ambient mood lighting in the vehicle interior. Ambient mood lighting in automotive vehicles has become increasingly popular with the increased usage of LEDs. Ambient mood lighting 22a, 22b may optionally be directed out of the vehicle 10. Ambient mood lighting 22a, 22b may also be directed into the passenger compartment, rather then directly onto the vehicle headliner 12. Ambient mood lighting 22a, 22b contributes to the overall environment within the vehicle 10. The light assembly 20 may optionally be fitted with different colors or light frequencies create varying environmental effects produced by the ambient mood lighting 22a, 22b. Additionally, mood lighting 22a, 22b may extend forward and backward from the sunroof trim assemblies 14, 16. Furthermore, mood lighting 22a, 22b may fully circle the sunroof trim assemblies 14, 16, including around the corners of the sunroof trim assemblies 14, 16.

Figure 3:
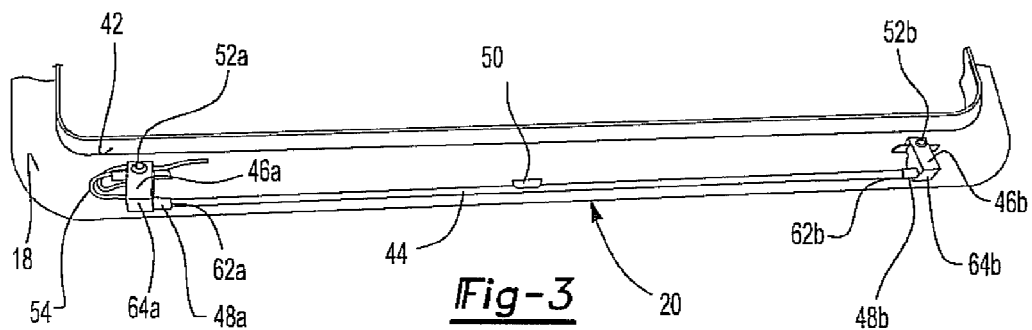
FIG. 3 shows a sectional perspective view of an installed lighting assembly in a trim ring.

FIG. 3 shows a sectional perspective view of an installed lighting assembly 20 installed within a trim ring 18. The light assembly 20 for an automotive sunroof 16 comprises the trim ring 18 mounted on the vehicle headliner 12. The headliner 12 includes a cutout having a peripheral edge. The cutout of the headliner 12 may be generally rectangular or square in shape. The cutout having a peripheral edge is configured to accept the trim ring 18. The trim ring 18 includes a lip 42 and is rectangular or square in shape and configured to securely and tightly fit within the cutout on the vehicle headliner 12 having a peripheral edge. The trim ring 18 is further configured to hold the sunroof trim assembly 14, 16.

The sunroof assembly (not pictured) comprises a sliding, or stationary, glass panel. The sunroof assembly also includes a motor or engine configured to power the glass panel in sliding movement. Optionally, the sunroof assembly may contain a screen. The sliding glass panel may be powered by a switch, or other device, by a passenger in the vehicle 10.

The lighting assembly 20 also comprises a light pipe 44 having a first end 62a and a second end 62b. The light pipe 44 is an elongated solid cylindrical member which may be comprised of a polymer-like, plastic, polymer or acrylic material. The light pipe 44 may optionally be colored, or textured, to provide unique ambient mood lighting environments within the vehicle interior. Power is provided to the light engine 46a, 46b by a plurality of wires 54 which connect to a power source. Alternatively, the light pipe 44 may be an elongated transparent or translucent tube made of a polymer-like, polymer, or acrylic material.

The lighting assembly 20 also includes at least one light engine 46a, 46b. The light engine 46a, 46b comprises a housing 64a, 64b and a light source. The light source of the light engine 46a, 46b is contained within the housing 64a, 64b of the light engine 46a, 46b. The light engine 46a, 46b may also optionally include a circuit board to control the light entering into the vehicle 10 interior. The light source may be a variety of commonly known LEDs or light bulb sources. These LEDs or light bulbs may be colored, or textured, to provide different and unique ambient mood light environments within the vehicle interior. LED lights are frequently the light source of choice for automobile designers looking for relatively inexpensive ways to enhance their vehicles' features via ambient mood lighting. LED lighting is cost efficient and creates a soft, warm and welcoming environment for a vehicle interior. LED lights have been used to illuminate compartments and vehicle accessories; however, LED lights have not been used to create ambient mood lighting on a vehicle interior roof, particularly, around a vehicle sunroof.

The lighting assembly 20 comprises a light pipe 44 having a first end 62a and a second end 62b. The lighting assembly 20 also includes at least one light engine 46a, 46b. The light engine 46a, 46b comprises a housing 64a, 64b and a light source (not pictured). The light source of the light engine 46a, 46b is contained within the housing 64a, 64b of the light engine 46a, 46b. In the present embodiment, the light pipe 44 extends between the light engines 46a, 46b. The first end 62a of light pipe 44 is positioned adjacent light engine 46a. Light from light engine 46a is transmitted into first end 62a of light pipe 44 thereby illuminating the light pipe 44. The second end 62b of light pipe 44 is positioned adjacent light engine 46b. Light from light engine 46b is transmitted into second end 62b of light pipe 44 thereby illuminating the light pipe 44. The lighting assembly 20 may further include connectors 48a, 48b. Connector 48a is configured to connect light engine 46a with the light pipe 44 at first end 62a. Connector 48b is configured to connect light engine 46b with the light pipe 44 at second end 62b.

The lighting assembling 20 may be connected to a switch operable by a passenger or driver of the vehicle 10, or the lighting assembly 20 may automatically illuminate upon opening a door, operation of the vehicle, change in time of day, or other varying situation.

The lighting assembly 20 is installed within the trim ring 18 by a variety of different means. Screws 52a, 52b may optionally be used to attach the light engine 46a, 46b to the trim ring 18. A clip 50 may also be used to better secure the light pipe 44 within the trim ring 18. Other attachment means such as clips or retainers may be used to install the lighting assembly 20 within the trim ring 18.

The light source contained within the housing 46a, 46b directs light down the light pipe 44 thereby creating a uniform output of light along the light pipe 44. Light from the light pipe 44 is directed into the vehicle interior, mainly onto the vehicle headliner 12, thereby creating ambient mood lighting within the automotive interior.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A lighting assembly for an automotive sunroof mounted to a vehicle headliner, the lighting assembly comprising:
    a trim ring having an elongated portion, the elongated portion having an outer surface and an opposed inner surface, the trim ring mounted to the vehicle headliner;
    at least one lighting element connected to the trim ring; and
    a light pipe having a first end and an elongated portion, said lighting element positioned adjacent said first end permitting light to travel along said light pipe, the elongated portion of the light pipe extending on the elongated portion of the trim ring such that the light from the elongated portion is projected on the headliner visible from the interior of the vehicle.

2. The lighting assembly for an automotive sunroof of claim 1, wherein said headliner includes a cutout having a peripheral edge.

3. The lighting assembly for an automotive sunroof of claim 2, wherein said trim ring is mounted along said peripheral edge.

4. The lighting assembly for an automotive sunroof of claim 1, wherein said lighting element is a light engine.

5. The lighting assembly for an automotive sunroof of claim 4, wherein said light engine includes a housing and a light source wherein said light source is contained with said housing.

6. The lighting assembly for an automotive sunroof of claim 5, wherein said light engine further includes a circuit board.

7. The lighting assembly for an automotive sunroof of claim 5, wherein said light source is an LED.

8. The lighting assembly for an automotive sunroof of claim 5, wherein said light source is a light bulb.

9. The lighting assembly for and automotive sunroof of claim 1, wherein said light pipe is an elongated solid cylinder.

10. The lighting assembly for an automotive sunroof of claim 1, wherein said light pipe is an elongated tube.

11. The lighting assembly for an automotive sunroof of claim 1, wherein said light pipe is generally transparent.

12. A lighting assembly for an automotive sunroof comprising:
    a trim ring having an elongated portion, the elongated portion having an outer surface and an opposed inner surface, the trim ring mounted on a vehicle headliner;
    a first lighting element and a second lighting element;
    a light pipe having a first end, a second end and an elongated portion, said first lighting element positioned adjacent said first end of said light pipe permitting light to travel down said elongated portion of the light pipe, said second lighting element positioned adjacent said second end of said light pipe permitting light to travel down said elongated portion of the light pipe; and
    said trim ring said light pipe extending between the first lighting element and the second lighting element, said light pipe mounted to the inner surface of the elongated portion of the trim ring such that the light from the elongated portion is projected on the headliner visible from the interior of the vehicle.

13. The lighting assembly for an automotive sunroof of claim 12, wherein said lighting element is a light engine.

14. The lighting assembly for an automotive sunroof of claim 13, wherein said light engine includes a housing and a light source wherein said light source is contained with said housing.

15. The lighting assembly for an automotive sunroof of claim 14, wherein said light source is an LED.

16. The lighting assembly for an automotive sunroof of claim 14, wherein said light source is a light bulb.

17. The lighting assembly for an automotive sunroof of claim 12, wherein said light pipe is an elongated solid cylinder.

18. The lighting assembly for an automotive sunroof of claim 12, wherein said light pipe is an elongated tube.

* * * * *